US011137131B2

(12) United States Patent
Yu et al.

(10) Patent No.: US 11,137,131 B2
(45) Date of Patent: Oct. 5, 2021

(54) LIGHT INJECTED TERMINAL LENSING AND COUPLING DEVICE

(71) Applicant: Vode Lighting LLC, Sonoma, CA (US)

(72) Inventors: Scott S. Yu, Tiburon, CA (US); Richard Wong, Santa Rosa, CA (US)

(73) Assignee: VODE LIGHTING, LLC, Sonoma, CA (US)

( * ) Notice: Subject to any disclaimer, the term of this patent is extended or adjusted under 35 U.S.C. 154(b) by 0 days.

(21) Appl. No.: 16/694,435

(22) Filed: Nov. 25, 2019

(65) Prior Publication Data

US 2020/0141556 A1 May 7, 2020

Related U.S. Application Data

(63) Continuation of application No. 15/496,889, filed on Apr. 25, 2017, now abandoned.

(60) Provisional application No. 62/329,680, filed on Apr. 29, 2016.

(51) Int. Cl.
| F21V 5/04 | (2006.01) |
| F21V 5/08 | (2006.01) |
| F21V 21/34 | (2006.01) |
| F21S 8/00 | (2006.01) |
| F21V 15/01 | (2006.01) |
| G02B 5/04 | (2006.01) |
| F21V 17/10 | (2006.01) |
| F21V 3/06 | (2018.01) |
| F21Y 113/00 | (2016.01) |
| F21V 23/06 | (2006.01) |
| F21Y 115/10 | (2016.01) |
| F21Y 103/10 | (2016.01) |

(52) U.S. Cl.
CPC ............... *F21V 5/04* (2013.01); *F21S 8/033* (2013.01); *F21V 5/08* (2013.01); *F21V 15/01* (2013.01); *F21V 21/34* (2013.01); *G02B 5/045* (2013.01); *F21S 8/035* (2013.01); *F21V 3/0625* (2018.02); *F21V 17/104* (2013.01); *F21V 23/06* (2013.01); *F21Y 2103/10* (2016.08); *F21Y 2113/00* (2013.01); *F21Y 2115/10* (2016.08)

(58) Field of Classification Search
CPC ... F21S 8/033; F21S 8/035; F21V 15/01; F21V 17/104; F21V 21/34; F21V 23/06; F21V 3/0625; F21V 5/04; F21V 5/08; F21Y 2103/10; F21Y 2113/00; F21Y 2115/10; G02B 5/045
See application file for complete search history.

(56) References Cited

U.S. PATENT DOCUMENTS

| 4,573,111 A | 2/1986 | Herst |
| 5,226,724 A * | 7/1993 | Kanarek .................. F21S 2/00 362/151 |
| 5,961,072 A | 10/1999 | Bodie |
| 6,302,557 B1 | 10/2001 | Santosuosso |
| 9,316,805 B2 | 4/2016 | Howe |
| 9,423,104 B2 | 8/2016 | Durkee |

(Continued)

*Primary Examiner* — Tsion Tumebo
(74) *Attorney, Agent, or Firm* — Michael Petrin; Peter Tormey; Antero, Tormey & Petrin

(57) ABSTRACT

An adaptable coupling device with connection element and prismatic lens functioning as a termination means to provide seamless, integrated and continuous lighting to a distal portion of at least of one end region of a lighting element or light rail assembly.

20 Claims, 7 Drawing Sheets

(56) References Cited

U.S. PATENT DOCUMENTS

| | | |
|---|---|---|
| 9,441,818 B2 | 9/2016 | Dixon |
| 9,456,704 B2 * | 10/2016 | Bhargava ................ A47F 3/001 |
| 9,494,293 B2 | 11/2016 | Pickard |
| 9,699,856 B2 | 7/2017 | Roberts |
| 9,822,951 B2 | 11/2017 | Lu |
| 9,874,333 B2 | 1/2018 | Lay |
| 9,989,206 B2 | 6/2018 | Eddins |
| 10,612,747 B2 * | 4/2020 | Rodgers ................... F21V 3/00 |
| 2011/0310604 A1 * | 12/2011 | Shimizu ................... F21K 9/27 |
| | | 362/235 |
| 2014/0268720 A1 * | 9/2014 | Dungan ............... F21V 23/026 |
| | | 362/218 |
| 2014/0268748 A1 * | 9/2014 | Lay .......................... F21V 5/04 |
| | | 362/235 |
| 2015/0338053 A1 * | 11/2015 | Rector ..................... F21V 5/02 |
| | | 362/224 |
| 2017/0051895 A1 | 2/2017 | Gielen |

* cited by examiner

LIGHT INJECTED TERMINAL LENSING AND COUPLING DEVICE

This utility application claims the benefit of the priority of the following United States patent applications: U.S. provisional application No. 62/329,680 filed on Apr. 29, 2016, and U.S. utility application Ser. No. 15/496,889 filed on Apr. 25, 2017, both of which are hereby incorporated herein in their entirety by reference.

BACKGROUND

The present disclosure relates generally to coupling devices and means to eliminate non-illuminated gaps between adjacently positioned lighting systems and light rail assemblies. The present disclosure relates more specifically to coupling devices for joining adjacently positioned lighting systems to provide seamless continuous lighting by illuminating the gap region between the adjacent lighting systems using illumination from one or more of the lighting systems themselves redirected by prismatic optical means. The present disclosure also relates more specifically to an adaptable coupling device with connection element and a prismatic lens for joining two or more lighting rail assemblies together to provide seamless, integrated and continuous lighting across the coupling region and securing the relative position between the lighting rail assemblies and associated elements. The present disclosure also relates more specifically to an adaptable coupling device with connection element and prismatic lens functioning as a termination means to provide seamless, integrated and continuous lighting to a distal portion of at least of one end region of a lighting element or light rail assembly.

Various approaches in the art have employed related means to terminate a lighting fixture, including close placement of the light source or a portion thereof near a terminus, or angling of the light source at a degree of arc sufficient to extend the extent of radiative illumination to the terminus or beyond the terminus of the lighting fixture. However, these approaches necessitate the redesign of either the light engine or the lighting fixture or both in order to alleviate or reduce an unilluminated or under-illuminated terminal region of the lighting fixture, resulting in greater complexity in manufacture, assembly and cost of production. Further, these approaches do not necessarily provide a uniform, gap-less transition in illumination between adjacent units. The human eye is incredibly perceptive of gaps or reduction in intensity, particularly between adjacent lighting fixtures, and many of the previous approaches fail to meet the aesthetic standard of the present disclosure which provides an approach and means to eliminate or significant reduce any perceived gaps in illumination between adjacent lighting fixtures, so that interface region or zone between adjacent lighting fixtures or light rail assemblies is uniformly and continuously illuminated and any change or gap in illumination is essentially negligible or imperceptible by a person with normal vision.

Accordingly, there is a need for a better means to couple adjacent lighting fixtures to eliminate or reduce the perception of an under- or un-illuminated gap or zone or transition between them that does not require modification to the standard light engine or source, or significant changes or modifications to the lighting fixture itself.

There is also a need for a better means to terminate a lighting fixture yet provide illumination to the farthest possible distal region or terminus of the fixture, so that the illumination is continuous across the lighting fixture and continuous to the terminal regions or both termini of a single lighting fixture.

SUMMARY

Disclosed herein are multiple embodiments of the present disclosure relating to an improved means to terminate and connect adjacent lighting fixtures using a light injected terminal prismatic lensing and coupling device that can be employed at the terminus or junction between light rail-style lighting fixtures. Disclosed herein are multiple embodiments employing the use of a light injected terminal prismatic lensing and coupling device that can be secured to one or a plurality of T-bar style rail channels forming a light rail assembly.

One embodiment of the present disclosure includes a coupling device for a light rail assembly comprising a (A) prismatic lens for providing illumination; wherein said prismatic lens includes (i) a lens front surface and a lens back surface each extending to (ii) a lens left surface, a lens right surface and a lens bottom surface; wherein all said three surfaces are in perpendicular orientation to each other and all are connected to each other by at least one common edge to said lens front surface and said lens back surface and to each of said left and right lens surfaces by at least one common corner junction, each of said lens left and side surfaces and said lens back surface extending to (iii) a prismatic top surface region, wherein said prismatic top surface region includes (a) a lens top surface extending to said back surface, to said lens left surface and to said lens right surface and extending to (b) a lens top side corner apex; wherein said lens top side corner apex extends to (c) a lens angled light injection surface; wherein said lens angled light injection surface extends to said lens front surface forming an angle Ø with respect to the plane of said lens front surface and the plane of said lens angled light injection surface; wherein said angle Ø is between 10 and 90 degrees; (B) a connection element for positioning and retaining said prismatic lens; wherein said connection element has a yoke configuration having (i) a right connection riser portion, and (ii) a left connection riser portion; each of said connection riser portions being opposed to one another, and adjacent to and extending upward from a horizontal yoke lower bar; wherein said right and left connection riser portions each bear a yoke securement tab; wherein said yoke securement tabs extend horizontally from a front surface of said connection riser portion; wherein said yoke securement tabs are configured to engage with one or a plurality of corresponding receptive T-bar connection channels located on an interior surface of a light bar assembly.

In another embodiment of the present disclosure, the prismatic lens features one or more lens positioning elements located on at least one of said lens right surface and said lens left surface; wherein said lens positioning element is selected from a bead, tab, linear protrusion, raised surface feature, and combinations thereof; wherein said lens positioning element has a geometry selected from a circle, square, rectangular, semi-circle, semi-oval, triangle or other geometric shape capable of being mated with a complimentary inversely-shaped receptive lens positioning element; wherein said lens positioning element can be in one continuous form or a plurality of discontinuous forms extending in a vertical direction on at least one of said lens side surfaces of said prismatic lens; and wherein when said lens positioning element located at said lens right or lens left surface protrudes from either of said lens surface, the corresponding lens positioning element located on said right or left connection element riser portion is in the form of a complementary inversely shaped cutout region on either of said connection element riser portion surfaces.

In a related embodiment of the present disclosure, the prismatic lens features one or more lens positioning elements located on at least one of said lens right surface and said lens left surface; wherein said lens positioning element is selected from a depression, cutout, channel, divot, and combinations thereof; wherein said lens positioning element has a geometry selected from a circle, square, rectangular, semi-circle, semi-oval, triangle or other geometric shape capable of being coupled with a complimentary inversely shaped lens positioning element present on said connection element; wherein said lens positioning element can be in one continuous form or a plurality of discontinuous forms extending in a vertical direction on at least one of said side surfaces of said prismatic lens; and wherein when said lens positioning element located at said lens right or lens left surface protrudes from either of said lens surface, the corresponding lens positioning element located on said right or left connection element riser portion is in the form of a complementary inversely shaped protrusion extending from either of said connection element riser portion surfaces.

In yet another related embodiment of the present disclosure, the prismatic lens has been slightly modified to include a lens top side corner apex featuring a beveled edge extending from said lens top surface and extending to said lens angled light injection surface; wherein said beveled edge has a thickness greater than or equal to a primary lens; and wherein said beveled edge forms a 90 degree angle with respect to the plane of said lens top surface. In this embodiment, the beveled edge insures that the primary lens and the top surface of the prismatic lens are essentially level or in the same plane as one another so as to prevent any significant space or gap occurring between them and improving the perception of a continuously (gapless) illuminated junction between two light rail assemblies joined together in an end-to-end configuration.

In another embodiment of the present disclosure, the prismatic lens features a lens angled light injection surface extending to said lens front surface and forming an angle Ø with respect to the plane of said lens front surface and the plane of said lens angled light injection surface; wherein said angle Ø is between 10 and 90 degrees; or alternatively between 20 and 80 degrees, or yet alternatively between 30 and 70 degrees, or alternatively between 40 and 60 degrees.

In one embodiment of the present disclosure, the prismatic is constructed of an optically transparent material capable of transmitting visible light wavelengths.

In a related embodiment of the present disclosure, the connection element features right and left connection riser portions each bearing a connection yoke alignment groove in the form of a U-shaped cutout facing outward from each of the side faces of each of said connection risers and located adjacent to and below said yoke securement tabs; wherein said U-shaped cutout extends to the front side and back side of each of said connection riser portions. In this embodiment, the connection yoke alignment groove serve to provide a means for inserting/removing the connection element from an end of the T-bar rail channel using the alignment grooves to hold the connection element. In related embodiments, the connection yoke alignment grooves act to receive complementary sized and positioned securement tabs located on an interior facing surface of a termination element that reversibly attaches to the outward or distal end of the connection element when the latter is securely positioned at the terminus or distal end of the T-bar channel of the light rail assembly of the present disclosure.

In a related embodiment of the present disclosure, the connection element of features right and left connection riser portions that each bear a plurality of yoke securement tabs; wherein said yoke securement tabs extend in opposite directions horizontally from both said front surface and said back surfaces of both of said connection riser portions; wherein said yoke securement tabs are configured to engage with at least one or a plurality of corresponding receptive channels located on an interior surface of two light bar assemblies positioned in an end-to-end configuration wherein said plurality of yoke securement tabs operate to removable position and hold said connection element and said two light bar assemblies in a fixed position relative to each another. In this present embodiment, the dual and oppositely facing yoke securement tabs enable the connection element to engage a first and second light rail assembly in an end-to-end configuration with the connection element located between the two light rail assemblies, with one distal end of a first light rail assembly engaged with one set of yoke securement tabs on one side of the connection element, and a second light rail assembly having its proximate end secured with the second set of yoke securement tabs on the other, or opposite, side of the connection element, so that the first and second set of yoke securement tabs engages with and secures a first T-bar channel of the first light rail assembly to the second T-bar channel of the second light rail assembly. In a related embodiment of the present disclosure, the connection element bears only one or set of two yoke securement tabs located on a common (i.e. the same) internally-facing side of one or both of the connection riser portions of the connection element.

In further related embodiments of the present disclosure, the yoke securement tabs feature a truncated trapezoidal cross-section with sides tapering from a larger tab outer face to a small tab inner face extending from a tab upper slope portion and extending to a tab lower slope portion; wherein the angle β, being the angle formed between the surfaces of said tab upper slope portion and said tab lower slope portion with respect to the surface plane of the tab outer face, is between 20 degrees and 60 degrees, or alternatively between 30 degrees and 45 degrees. In this and related embodiments, the shape and geometry of the securement tabs enabling easy but secure coupling of the tabs with conventional U-shaped style grooves in the T-bar rail channel that are sized and shaped appropriately to receive and reversibly secure the securement tabs within the groove without the need of any other means than frictional fit to maintain the secure connection.

In another related embodiment of the present disclosure, the coupling device further features a termination element; wherein said termination element operates to terminate a light rail assembly; wherein said termination element is opaque to visible light through its minor cross-section (thickness); and wherein said termination element is removably positionable adjacent to and in parallel orientation with respect to said lens back surface of said prismatic lens.

In a closely related embodiment to that above, the termination element features one or two securement tabs located on either a left or right side of said termination element; wherein said securement tabs extend horizontally from an interior surface of said termination element and wherein said securement tabs are positioned and sized in order to mate with said connection yoke alignment tabs located on the outside surfaces of said respective left and right connection riser portions of said connection element.

In yet another related embodiment of the present disclosure, the termination element is configured in the form of a layered compound construct of at least two layers of distinct materials; wherein said layered compound construct is in the form of a rectangular solid having a top side, left side, right side, front side, back side and bottom side; wherein said back side bears a layer of material that is opaque to visible light; and wherein said a least one layer adjacent to said front side is transparent to visible light; and wherein at least one of said left side, right side and bottom sides may optionally bear a coating of a third material; wherein said third material is reflective with respect to incident visible light; and wherein at least one of said coated sides operates to internally reflect and redirect any incident light entering said front side to be retransmitted at least in part through said top surface in an outgoing direction with respect to said top surface.

In another aspect of the present disclosure, one embodiment includes a light rail assembly comprising one or a plurality of T-bar rail channels; each of said T-bar rail channels consisting of (i) a primary lens; wherein said primary lens is positionable within a plurality of upper receptive grooves with said T-bar rail channels configured to receive and secure said primary lens; (ii) a light engine board; wherein said light engine board features one or a plurality of light emitting elements located on a top surface of said light engine board and configured to emit visible radiation in the direction of said primary lens; (iii) a coupling device that operates to terminate one or both of said T-bar channels; wherein said coupling device is in the form of a U-shaped yoke with a right connection riser portion extending from a yoke lower bar and an opposed left connection riser portion extending from said yoke lower bar; wherein said right and left connection riser portions each bear at least one yoke securement tab positioned on at least one inner side of said coupling device and configured to engage with and be secured within at least one of a plurality of lower receptive grooves within said T-bar rail channels; wherein said coupling device supports a prismatic lens; (iv) a prismatic lens; wherein said prismatic lens is configured to have a prismatic top surface region, a lens angled light injection surface and a lens lower portion; wherein said prismatic lens is configured to receive and redirect incident illumination outward in a direction normal to the top surface of the prismatic top surface region; wherein said prismatic lens includes (a) a lens front surface and a lens back surface each extending to (b) a lens left surface, a lens right surface and a lens bottom surface; wherein all said three surfaces are in perpendicular orientation to each other and all are connected to each other by at least one common edge to said lens front surface and said lens back surface and to each of said left and right lens surfaces by at least one common corner junction, each of said lens left and side surfaces and said lens back surface extending to (c) a prismatic top surface region, wherein said prismatic top surface region includes (1) a lens top surface extending to said back surface, to said lens left surface and to said lens right surface and extending to (2) a lens top side corner apex; wherein said lens top side corner apex extends to (3) a lens angled light injection surface; wherein said lens angled light injection surface extends to said lens front surface forming an angle Ø with respect to the plane of said lens front surface and the plane of said lens angled light injection surface; wherein said angle Ø is between 10 and 90 degrees; (v) a plurality of lower receptive grooves within said T-bar rail channels configured to receive and reversibly secure one or a plurality of said yoke securement tabs; and (vi) one or a plurality of termination elements located on the outside facing surface of said prismatic lens; wherein said termination element operates to block the transmission of visible light outward from the distal end of said T-bar rail channel.

In a further related embodiment of the present disclosure, light rail coupling device operates to position and removably secure two adjacent T-bar rail channels together in a fixed end-to-end configuration with said coupling device sandwiched in a junction between a distal end of one of said T-bar rail channels and a proximate end of said second T-bar rail channel; wherein said coupling device features two opposed sets of one or a plurality of said yoke securement tabs; wherein said opposed sets of said yoke securement tabs extend outwardly and in a normal horizontal direction with respect to a back and front surface of said connection element; wherein said opposed sets of said yoke securement tabs are located on said back and said front surface of said right and said left connection riser portion; and wherein said prismatic lens is configured to be immediately adjacent to and in contact with both primary lenses of said two adjacent T-bar rail channels so as to form a continuous and seamless illumination zone that extends across said junction occupied by said coupling device.

In a related embodiment of the present disclosure the light rail assembly coupling device further operates to secure a termination element to a distal end of said T-bar rail channel; wherein said termination element comprises one or a plurality of optical layers wherein at least one of said optical layers is an opaque layer that does not transmit visible wavelengths of light; wherein said termination element optionally includes one optical layer that is capable of transmitting or reflecting visible wavelengths of light; wherein said second optical layer may be in the form of a rectangular optical block with three of the sides of said optical block being coated with an internally reflective coating.

In another related embodiment of the present disclosure the termination element further includes a plurality of at least two termination element securement tabs extending outward and normally from the surface of one interior facing side of said termination element; wherein said securement tabs are configured to reversibly engage with and be secured within corresponding connection yoke alignment grooves present on one or more of said connection riser portions of said yoke portion of said connection element.

These aspects and embodiments of the present disclosure and those additional options presented hereinbelow further help to define the scope of the inventive disclosure and the various features, functions, properties and characteristics of the disclosed elements, components, portions and combinations thereof that constitute elements of the present invention.

Figure 1:
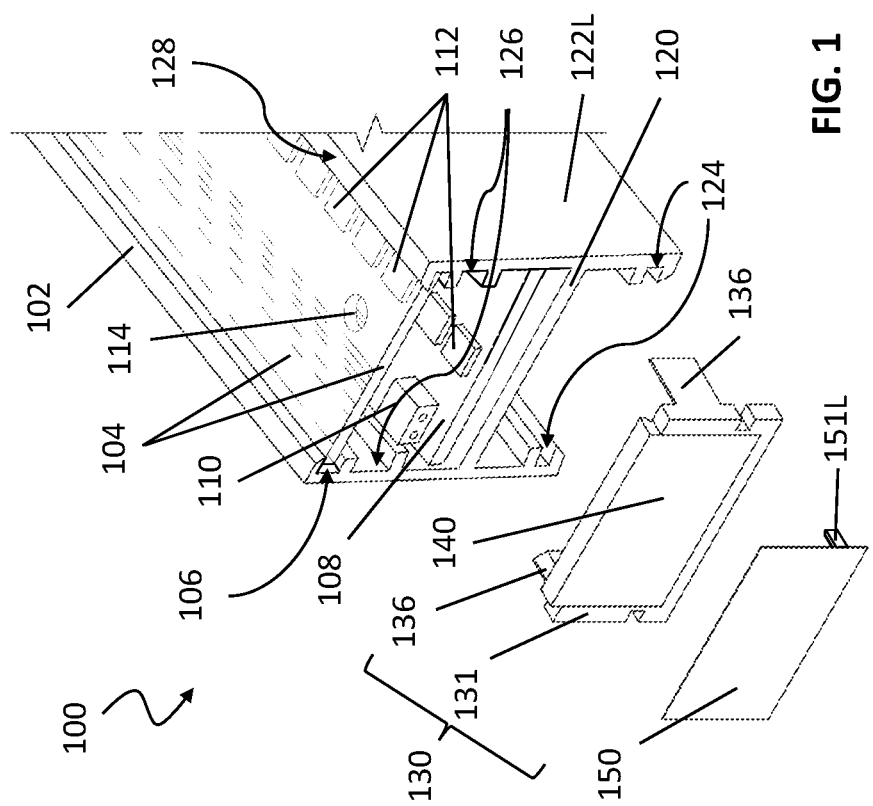
FIG. 1 shows one embodiment of a light rail assembly partially exploded to show a connection element and optional termination element.

A corresponding Figure Key detailing the specific component parts, regions and means of the inventive embodiments of this instant specification accompany each of the above Figures as found in the Appendix attached hereinbelow.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The term "fixture" generally means a device for physically supporting an electrical component such as a luminaire, switch assembly, electrical outlet or other like devices.

The term "lighting fixture" generally refers to a fixture that provides light or illumination to a surface or volume and which may include either a light source, a lamp, a reflector for directing the light, an aperture (with or without a lens), an outer shell or a housing for lamp alignment and protection, an electrical ballast (if required), and a connection to a power source, as well as support means to attach or suspend to a surface, or attach or connect to other lighting fixture.

The term "luminaire" generally refers to a lighting fixture which may include either a light source, a lamp, a reflector for directing the light, an aperture (with or without a lens), an outer shell or a housing for lamp alignment and protection, an electrical ballast (if required), and a connection to a power source.

The term "light source" generally refers to any device that can provide illumination or emit a visible or near-visible source of radiation perceptible by a typical human eye. Light sources include without limitation, for example, light emitting diodes (LED), LED arrays, laser emitting diodes (LDs), incandescent lamps, fluorescent lamps, electroluminescent elements (ELE), inductive lighting elements, and combinations thereof.

The term "component" or "electrical component" generally means a device used to provide access to or control an electrical power system such a luminaire, a luminaire support, a switch, electrical outlet and like devices.

The term "receptacle" generally means a physical structure for receiving another physical structure through the use of an opening or protrusion.

The term "electrical receptacle", "power receptacle" and the like generally refer to receptacles whose primary function is to couple electrical energy.

The term "coupling", "coupling element", "connection means" and the like generally refer to a means to removably but fixedly connect two parts together, such means including typical fasteners such as for example, but not limited to, bolts, pins, rods, screws, magnets and combinations thereof.

The term "suspension", "support element", "suspension element" and the like generally refer to a means to fixedly support a lighting element or combination of one or more thereof, with respect to a position adjacent to an upper horizontal support surface, such as for example, but not limited to, a ceiling, ceiling member, interior roof, strut, beam or other building surface from which a light, lamp or lighting system is desired to be attached to and suspended from.

The term "mounting means", "mounting element," "mounting system" and the like generally refer to a means to fixedly support and position a lighting assembly, or an element of a lighting assembly to a fixed position in a room or a fixed location on another component, element, portion or surface.

The term "fastening means", "fastening device", "fastener" and the like generally refer to a means to attach two elements or components together, and include for example, but are not limited to a cable, wire, strut, bar, screw, bold, rivet, collet, pin, snap, dowel, friction fitted joint, adhesive, and the like.

Read this application with the following terms and phrases in their most general form. The general meaning of each of these terms or phrases is illustrative, not in any way limiting.

Detailed Description

FIG. 1 shows the terminus or terminal end of an embodiment of a light rail assembly 100 in the form of a T-bar rail channel 102 that is mold extruded in this particular embodiment to include multiple grooves or channel guides located on the surface of one or more walls of 102 to accommodate the placement and securement of various elements of the light rail assembly 100 within the T-bar rail channel 102, as well as a means to attach, secure and/or suspend 102 to a surface, ceiling, wall or other supporting means.

The T-bar rail channel 102 features at least one interior cross T-member 120 that provides rigidity to 102 and maintains the right and left T-bar channel side surfaces 122L (122R or right side not fully visible in FIG. 1) in an essentially rigid and parallel configuration. Multiple grooves or slots on one or more interior surfaces of the T-bar rail channel 102 accommodate the placement and securement of a primary lens 104, which is translucent or transparent in nature so as to provide for the passage and transmission of light from the interior positioned light engine board 110 that is held in position within 102 by means of two opposed primary lens channel guides 106 located respectively on the interior 122R and 122L wall of 102, which provide sufficient clearance to enable the respective right and left sides of 110 to be slidingly positioned within the two grooves present within the primary lens channel guides 106, without any other securement of attachment means required, enabling easy placement or replacement of the primary lens 104 during assembly or repair.

The T-bar rail channel 102 also features multiple grooves or slots on an interior surface of 102 to accommodate other elements of the light rail assembly 100, including opposed T-bar suspension mounting channels 124 that operate to slidingly receive and engage with a suspension element (not shown), and also including opposed T-bar connection channels 126 that operate to slidingly receive and engage with at least one or both securement tabs 136 of the inventive connection element 130.

In this embodiment of the invention, the T-bar rail channel 102 also features an interior surface with some mounting means (not detailed) to securely engage and hold the light engine board 108 in a fixed and stable position within 102 with access to said mounting means 114, the light engine board 108 featuring a control circuit housing 110 that distributes power to the collective array or plurality of individual LED elements 112 that face upward from the surface of 108 to provide illumination when the control circuit housing 110 provides power or a control signal is received by 110 to energize one or more of the LED elements 112 present on 108.

In this embodiment of the invention, the dual functioning connection element 130 is used in a terminal configuration to close one end of a light rail assembly 100 by capping an open end of the T-bar rail channel 102. In a terminal configuration, the light rail assembly 100 is not to be joined to the end of another similar channel 102, but is desired to be terminated. Here, the connection element 130 features a U-shaped yoke portion 131, optioning having a lens securement element (not shown) or other means of guiding and holding the prismatic lens 140 in position and aligned within the connection element 130 at least removably secured to the yoke portion 131, by means of an complementary inversely configured lens securement element (not shown) present on the inside surfaces of the U-shaped yoke portion 131. For terminal configurations, it is desirable for no light to leak out of the otherwise open side face of the light rail assembly 100, so in one embodiment of the invention, an opaque termination element 150 is attached to the outside (distal facing) side of the prismatic lens 140 located with the connection element 130 that functions to block the transmission of any light from the interior region of the light rail assembly 100 and in particular from the interior region of the T-bar rail channel 102 defined by the space between the primary lens 104 and the front or top surface of the light engine board 108. The connection element 130 features two opposed securement tabs 136, a right and left positioned tab with respect to the yoke portion 131 and wherein said tabs are configured to engage with respective T-bar connection channels 126 located on the right and left respective interior sides of the T-bar rail channel 102, so that the tabs 136 are slidingly engageable and disengageable and yet capable of being frictionally held in position when fully inserted into the respective T-bar rail channels 102, and yet also capable of being removed therefrom to disassemble the light rail assembly 100 when desired or to emplace or replace connection element 130 or components thereof.

In operation, light emitted by the plurality of LED elements 114 located on the front surface of the light engine board 108 travels essentially outward from the front surface in a radial pattern, some in part being subject to scattering and reflection from the internal surfaces of the T-bar rail channel 102 and some in part travelling directly outward from the surface of the LED elements 114 through the primary lens 104 and into the room or volume of space desired to be illuminated by the light rail assembly. Emitted light and other scattered and reflection light, and likely light from LED elements 114 immediately adjacent to an emplaced connection element 130 with a prismatic lens 140 enter into the lens and are internally reflected and ultimately redirected and transmitted through the lens 140 surfaces, including an upper facing portion or edge of the lens 140 that faces the exterior of the assembled light rail assembly 100 and so directs light upward and outward into the room or volume of space desired to be illuminated, serving to provide the appearance of the full illumination of the primary lens 104 continuing to the physical end boundary or distal end of the light rail assembly 100 while providing additional illumination to the end region of 100 where the connection element 130 is position with the prismatic lens 140 providing additional and enhanced illumination to this end region and simultaneously creating the appearance of a continuously illuminated region across the spacial transition from primary lens 104 to prismatic lens 140.

In further embodiments, an optional one or two additional right and left securement tabs (151R and 151L, not shown) are located on the inwardly facing surface of the termination element 150 in a position and orientation to enable these tabs to engage with receptive grooves present on the connection element 130, as shown and described in greater detail hereinbelow.

Figure 2:
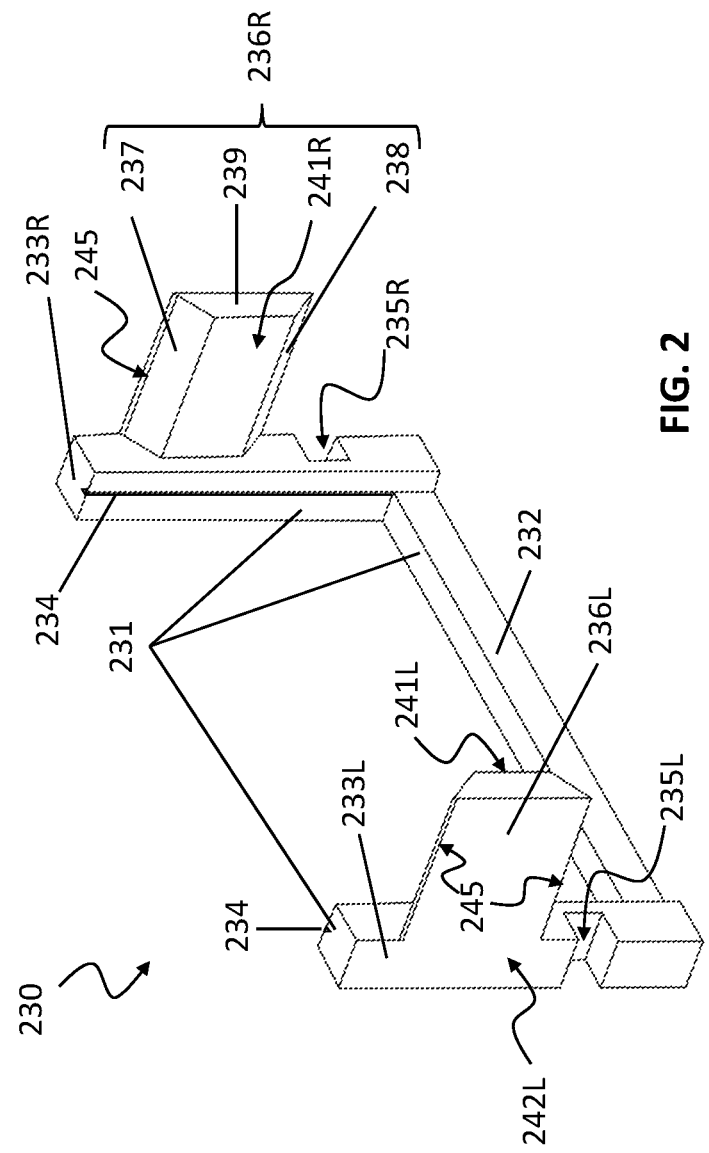
FIG. 2 shows one embodiment of a connection element featuring a yoke portion for receiving a connection lens element and securement tabs for attaching the connection element to a T-bar rail channel.

FIG. 2 shows another embodiment of a connection element 230 wherein the yoke portion 231 is illustrated to show more clearly the yoke lower bar 232 portion, the right and left connection riser portions, 233R and 233L, respectively, which each or both optionally featuring an interior facing lens positioning element 234 (right side shown) that operates to secure a prismatic lens 240 (not shown) to the yoke portion 231. This embodiment of the connection element 230 also features right and left yoke securement tabs, 236R and 236L, respectively, that operate to engage with the T-bar connection channels 126 located in the T-bar rail channel 102 shown in FIG. 1, to secure the yoke portion 231 in position at the terminus of the light rail assembly 101. In this embodiment, the right and left yoke securement tabs, 236R and 236L, respectively, each feature an optional beveled edge 245 on their respective top and bottom surfaces (top beveled edges visible in FIG. 2), and are tapered or angled in shape featuring a tab upper slope portion 237 and a tab lower slope portion 238, terminating in a tab end face 239 on each of the right and left yoke securement tabs. In this embodiment, the respective right and left yoke securement tabs 236R and 236L each feature tab upper and lower portions 237 and 238 that transition to the flat tab inner face 241, which is essentially parallel and coplanar with the flat tab outer face 242. The combination of beveled edges and tapered faces on the respective yoke securement tabs enable both 236R and 236L to frictionally engage with and be removable secured into the corresponding T-bar connection channels 126 on the T-bar rail channel 102.

In one embodiment, the lens positioning element 234 is selected from a complementary inversely-related geometric form. For example, when the lens positioning element 234 located on either the right or left connection riser portion 233 is a raised rectangular tab, the corresponding complementary inversely-related lens positioning element located on the prismatic lens (as discussed hereinbelow) is in the form of a similarly sized and shaped rectangular cutout present on the mating surface of the prismatic lens, which can accommodate the raised rectangular tab, thus operating to secure the prismatic lens within the connection element 230, as further illustration in FIG. 4 and accompanying disclosure hereinbelow.

In one embodiment, the respective two (left and right) connection riser portions 233 of the yoke portion 231 each feature an outwardly directed connection yoke alignment groove 235R and L, respectively, essentially in the shaped of a U-channel that accommodates either of the following: receptive tabs from another connection element, receptive tabs from an insertion/removal tool to assist in the placement and removal/replacement of the connection element 230 when engaged/disengaged from a terminus of a light rail assembly as disclosed herein. In other related embodiments, the respective right and left connection yoke alignment grooves 235 are configured to receive receptive tabs from a termination element 250 (not shown) which corresponds to termination element 150 (with securement tabs 151R and 151L as shown in FIG. 1) or in this embodiment in FIG. 2 wherein additional right and left securement tabs (251R and 251L, respectively) located on the opposite sides of the termination element 250 (not shown) in a position and configuration enabling the securement tabs 251 to engage with the corresponding yoke alignment grooves 235 in order to secure and hold the termination element 250 in position in parallel alignment with the connection element 230, the right tab 251R aligning with and securable within the connection yoke alignment groove 235R, and the left tab 251L alight with and securable within the connection yoke alignment groove 235R located on the lower portion of the yoke portion 231 of the connection element 230.

Figure 3:
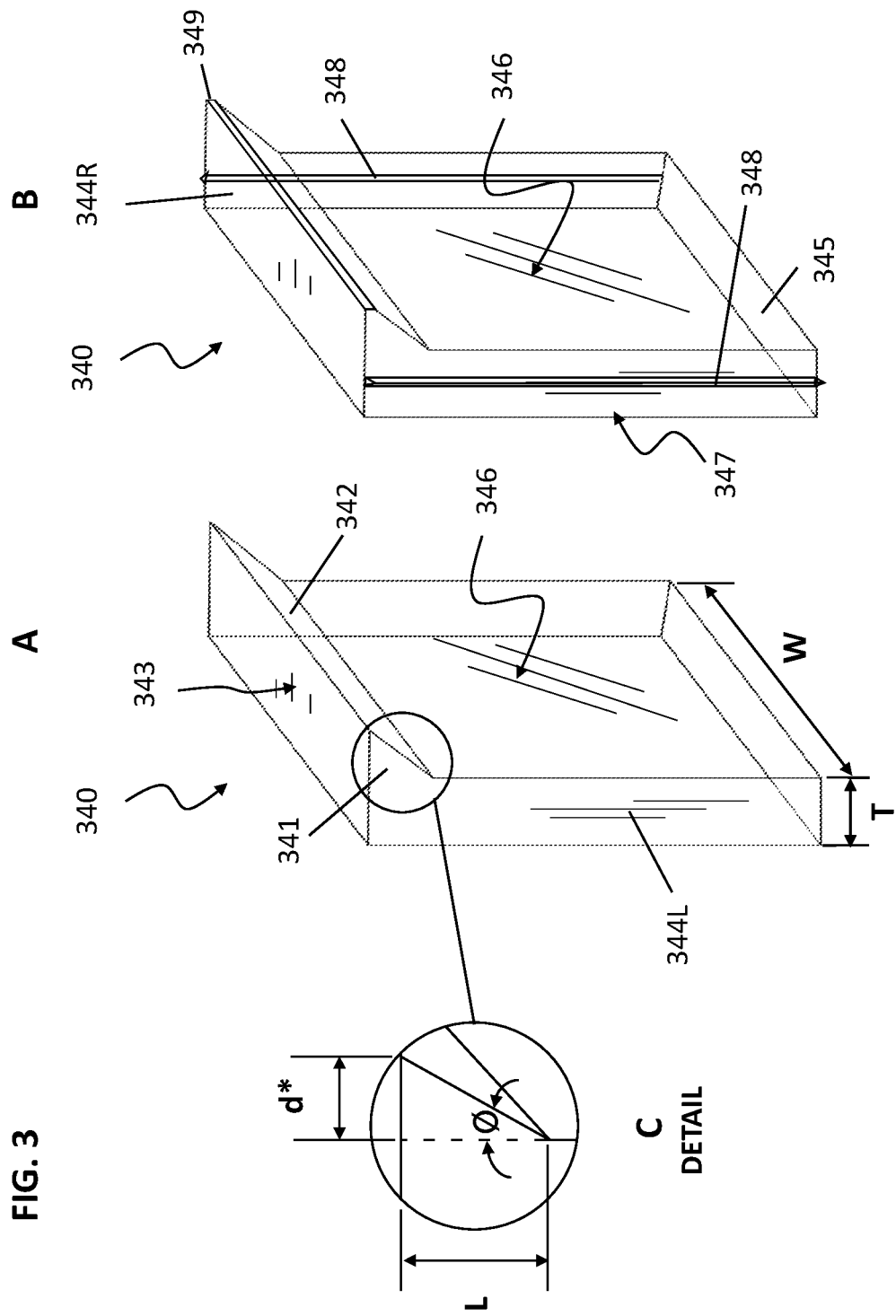
FIG. 3 shows one embodiment of a prismatic lens featuring a lens upper prisms portion and lens angled light injection surface and optional lens position tab(s).

FIG. 3 shows two embodiments, A and B, of a prismatic lens 340, wherein the B embodiment features an addition single or dual lens positioning element 348 located on the outer face of either or both of the lens right and left side, 344R and 344L, respectively. This optional lens positioning element 348 is shown in FIG. 3 configured as a triangular style tab, but can be in the form of any suitable tab, bead, linear protrusion, groove, channel, divot, and combinations thereof, wherein the shape or geometric of the lens positioning element or groove is for example, selected from, but not limited to, a square, rectangular, semi-circle, semi-oval, triangle or other geometric shape capable of being coupled with a complimentary shaped connection element alignment groove 235, located on one or both interior sides (right and left) of the respective connection riser portion 233 of the yoke portion 231 of the connection element 230, as shown in FIG. 2. In related embodiments, the lens positioning element can be in the form of a continuous bead or tab, or a plurality of discontinuous beads or tabs extending along the side of the lens from top to bottom. In yet further embodiments, the lens positioning elements may be present on the yoke portion of the connection element, while a receptive groove or complimentary shaped connection alignment groove is located on the sides of the prismatic lens. In yet further related embodiments, the sides of the prismatic lens and the interior sides of the connection riser portions (left and right) of the yoke element can have both complementary beads and tabs corresponding to oppositely configured alignment grooves, in any suitable pattern, enabling selective placement and securement of the prismatic lens within the yoke in the desired position and orientation, i.e. tab and groove patterns that allow only one (correct) orientation of the lens when placed so that it faces in the desired direction, having the lens front surface facing towards the interior of the light rail assembly.

In FIG. 3, embodiment A of the prismatic lens 340 is configured in the shape of a rectangular solid with right and left lens side surfaces 344, lens bottom surface 345 adjacent to and connecting by edge to the lens front surface 346 and lens back surface 347, with the main body of the prismatic lens 340 tapering to an upper lens top surface 343 that is configured in the shape of a prismatic portion, shown as the prismatic top surface region 341, the tapering side (interior) of the upper prism portion 341 transitioning to the lens front surface 346 by means of the tapered lens angled light injection surface 342.

In FIG. 3, embodiment B of the prismatic lens 340 features a set of two additional lens positioning elements 348 located approximately along the center line of the respective lens side surface left 344L and lens side surface right 344R (not labeled). In related embodiments, the lens positioning element 348 can be configured in any desired shaped as described hereinabove, and may be either continuous from top to bottom, or present in the form of one or more partial segments of length (height) less than the total height of the respective lens side surfaces 344. In an additional embodiment, embodiment B shows an optional lens prism beveled edge 349 feature that can also be incorporated into the design of the prismatic lens 340, and in particular the leading interior prismatic edge defined by the common intersection of the lens top surface 343 and the lens angled light injection surface 342. This lens prism beveled edge 349 feature protects the otherwise sharp edge of the prismatic top surface region 341 and further provides for increased top edge illumination by enabling light transmission to the extreme terminus of the prismatic lens 340 to help prevent any un-illumination portion corresponding to the terminus or gap between adjacent light rail assemblies configured in an end-to-end configuration.

In FIG. 3, both embodiments of the prismatic lens 340 feature an prismatic top surface region 341 which functions to gather incident light entering the lens angled light injection surface 342, in addition to scattered and redirected incident light entering the lens front surface 346 and internally reflected to some extent by each and every internal reflective surface formed by the respective inner surfaces of the two lens top surfaces 343, lens right and left side 344, lens front surface 346 and lens back surface 347, owing to the material of construction of the prismatic lens 340 being optically clear or translucent with respect to the wavelength of the incident light or radiation entering the lens resulting in partial internal reflection owing to differences in optical density between the lens material of construction and the surrounding ambient environmental media, here being air.

Accordingly, when the prismatic lens 340 is in position, located adjacent to and at the terminal end of a light rail assembly 100, internal illumination from the plurality of LED elements 114 located on the light engine board 110 resulting from direct illumination from LED elements located close to the terminus in combination with internally scattered light originating from other LED elements that is transmitted by multiple internal reflections from surfaces within the T-bar rail channel 102 space defined by the volume between the primary lens 104 and the cross T-member 120, all tend to enter a portion of the lens front surface 346 and the lens angled light injection surface 342 of the prismatic lens 340. Additional interior reflections of the light entering lens face 346 and 342 result in some internally reflected light being redirected upward and outward (perpendicular) to the lens top surface 343, resulting in this lens top surface 343 portion providing some degree of illumination, and when located at the terminus of the light rail assembly 100, appearing to extend the zone of illumination from the terminus to the opposite side of the prismatic lens 340, thus acting to provide illumination to the otherwise unlighted end region.

In one inventive embodiment, as detailed in inset caption C in FIG. 3, the prismatic top surface region 341 with its corresponding lens angled light injection surface 342 operate to capture and redirect a significantly increased amount of internally collected/redirected incident light that results in a surprisingly greater degree of illumination or light being transmitted outward from the lens top surface 343 than in the absence of the prismatic portion. It is believed, without being bound by theory, that the leading prismatic top surface region 341, when having an angle (Ø) of at least 10 degrees inclination with respect to the surface plane defined by the surface of the lens front surface 346 enables a significantly increased amount of light to be captured by the prismatic portion. In further embodiments, the angle of inclination of the prismatic top surface region 341 (with respect to the surface plane of 346) can vary from between 10 to about 90 degrees, or alternatively between 20 degrees to 80 degrees, or alternatively between 30 degrees to 70 degrees, or alternatively between 45 degrees to 60 degrees. Further, without being bound by theory, it is believed that the larger upper lens top surface 343 surface area produced by angling of the prismatic top surface region 341 enables the transmission of a greater amount of light owing to the increased surface with respect to the lower total surface area of the lens bottom surface 345, which corresponds to the area defined by the width (W) of the prismatic lens 340 times the cross-section (T) at the lens bottom surface 345 surface. Accordingly, the prismatic top surface region 341 results in an increased upper surface area at the lens top surface 343 surface that corresponds to the formula below, Equation 1:

$$A^* = W \times d^* = W \times L \times \tan Ø \qquad \text{Eq. 1}$$

wherein A* is the additional surface area of the lens top surface 343 resulting from the additional area of the lens upper prims portion 341; W is the horizontal width of the prismatic lens 340 from the right side to left side; L is the height of the prismatic top surface region 341 with respect to the lens top surface 343, wherein L is the side adjacent to Ø; and wherein Ø is the angle between the inclined hypotenuse of the lens angled light injection surface 342 and the flat surface of the lens front surface 346, being the side adjacent. Accordingly, in these inventive embodiments, the prismatic lens 340 thus functions to provide an additional area of illumination corresponding to the total surface area of the lens top surface 343 equivalent to:

$$A_{total} = A^* + A = A^* + (T \times W) \qquad \text{Eq. 2}$$

wherein A is the area corresponding to the unaugmented lens surface area equivalent to the width (W) times the thickness (T) of the prismatic lens at the base or below about midpoint (not including the prismatic portion) or corresponding to the surface area of the lens bottom surface 345 area. As a result of the increased surface (A*+A) of the lens area. top surface 342 owing to the added prismatic portion, illumination from this surface is increased, depending on the angle Ø, the dimension L and the resulting increased area, A*, of between 10 to 100%, or alternatively between 20 to 80%, or alternatively between 30 to 70%, or alternatively between 40 to 60% with respect to total emissivity or illumination in the absence of the prismatic top surface region 341, the percent of increased illumination (E) being proportional to the surface area of the lens top surface 343, corresponding to an increase of light illumination corresponding to:

$$\% \text{ Increase } E = 100 \times A^* / (A^* + A) \qquad \text{Eq. 3}$$

Suitable materials of construction for the prismatic lens 340 are discussed herein below.

Figure 4:
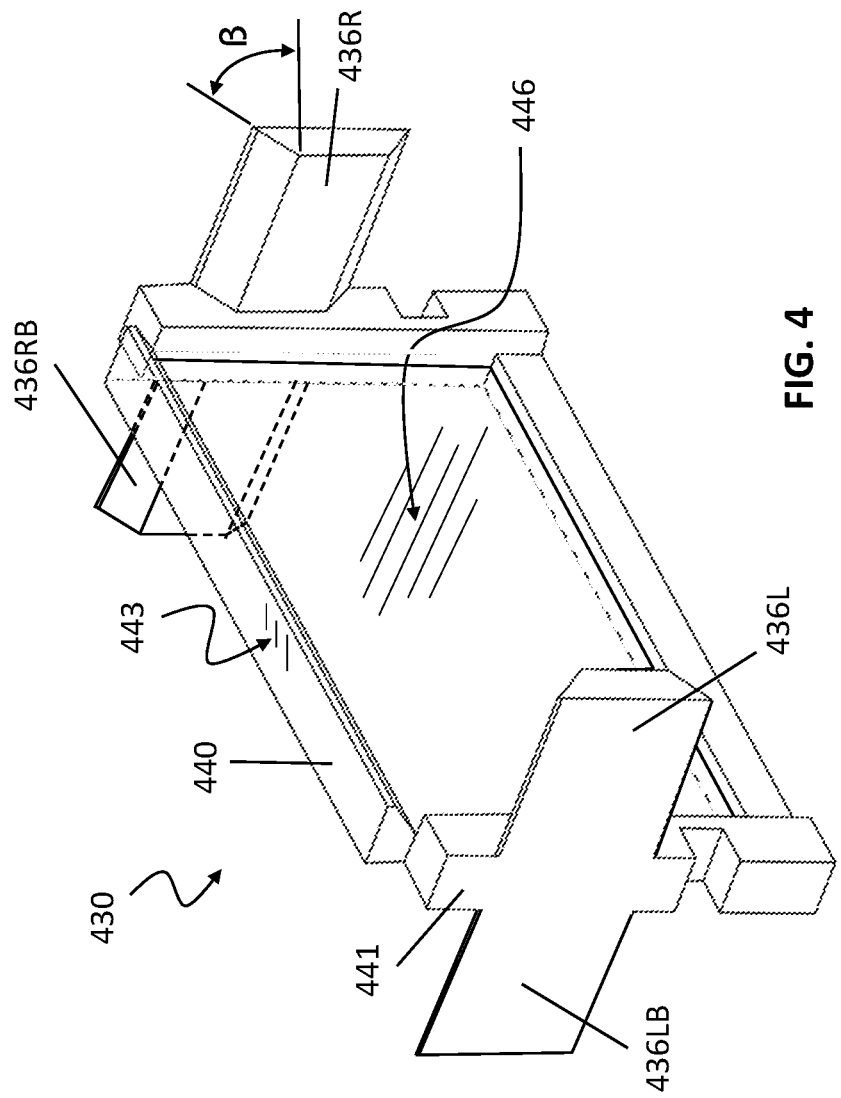
FIG. 4 shows one embodiment of a connection element with a prismatic lens secured in place and located within the connection yoke.

FIG. 4 shows one embodiment of the connection element 430 with prismatic lens 440 emplaced within the connection yoke 431, configured in its external dimensions and size to occupy the internal physical space and dimensions of the connection yoke 431 as defined by the height of the connection riser portion and width of the yoke lower bar portion. In this embodiment, the assembled connection element with lens 430 accommodates the straight-edged or lower portion of the prismatic lens 440 essentially within the confines of the space defined by the yoke elements, thus resulting in the prismatic top surface region 341 extending above the upper plane or extent of the connection yoke so that its height is approximately equivalent to, or coplanar with the outer surface of the primary lens 104, when the connection element with lens 430 is connected to the terminal end or terminus of an inventive light rail assembly as disclosed herein.

In one embodiment, as shown in FIG. 2, the connection element features one set of yoke securement tabs 236, a right side tab 236R and a left side tab 236L, which is suitable for terminating a light rail assembly. In a second embodiment, as shown in FIG. 4, the connection element features two sets of yoke securement tabs, inward facing right and left side tabs 436R and 436L, respectively, and in addition two outward facing right and left side tabs 436RB and 436LB, which enable the termination of two adjacent light rail assemblies end-to-end while also acting to secure the two adjacent light rail assemblies. In yet a third embodiment, two light rail assemblies can also be terminated with a single set tab configuration of the connection element each having only two tabs (as in FIG. 2), thus providing each of the terminal ends of the light rail assembly with their own connection element acting as a "terminal" element, but still enabling the end-to-end placement of the two light rail assemblies to prevent any illumination gap occurring between them when illuminated in the course of normal operation. This latter embodiment may be advantageous when adjacent light rail assemblies are mounted in an essentially stable and immovable position, for example but not limited to, attachment to a surface, wall, ceiling or the like. The embodiment illustrated in FIG. 4 may be advantageous when adjacent light rail assemblies are mounted in a suspended configuration where some relative movement of the light rail assembly with respect to the support means (for example a suspended configuration from a ceiling) or some relative movement between the adjacent light rail assemblies is possible, the double tabs in this optional embodiment acting to secure the relative position and orientation of two end-to-end placed light rail assemblies.

In one embodiment, the yoke securement tabs feature a truncated trapezoidal cross-section with sides tapering from a larger tab outer face to a small tab inner face extending from a tab upper slope portion and extending to a tab lower slope portion; wherein the angle $\beta$, being the angle formed between the surfaces of said tab upper slope portion and said tab lower slope portion with respect to the surface plane of the tab outer face, is between 20 degrees and 60 degrees, or in a related embodiment, alternatively between 30 and 45 degrees.

The trapezoidal cross-section and tapered slope portion of the yoke securement tabs act to ease the insertion and retention of the tabs into the receptive channels located within the T-bar rail channel, acting to center and secure the connection element in a fixed and stable position. In related embodiments featuring dual yoke securement tabs on a connection element configured to connect two adjacent light rail assemblies in an end-to-end configuration, the trapezoidal cross-section and tapered slope portion of the yoke securement tabs act to ease the insertion and retention of the tabs into the receptive channels located on both of each T-bar rail channel, thus operating to secure them in their relative adjacent and end-to-end position without any other means of attachment being necessary.

Figure 5:
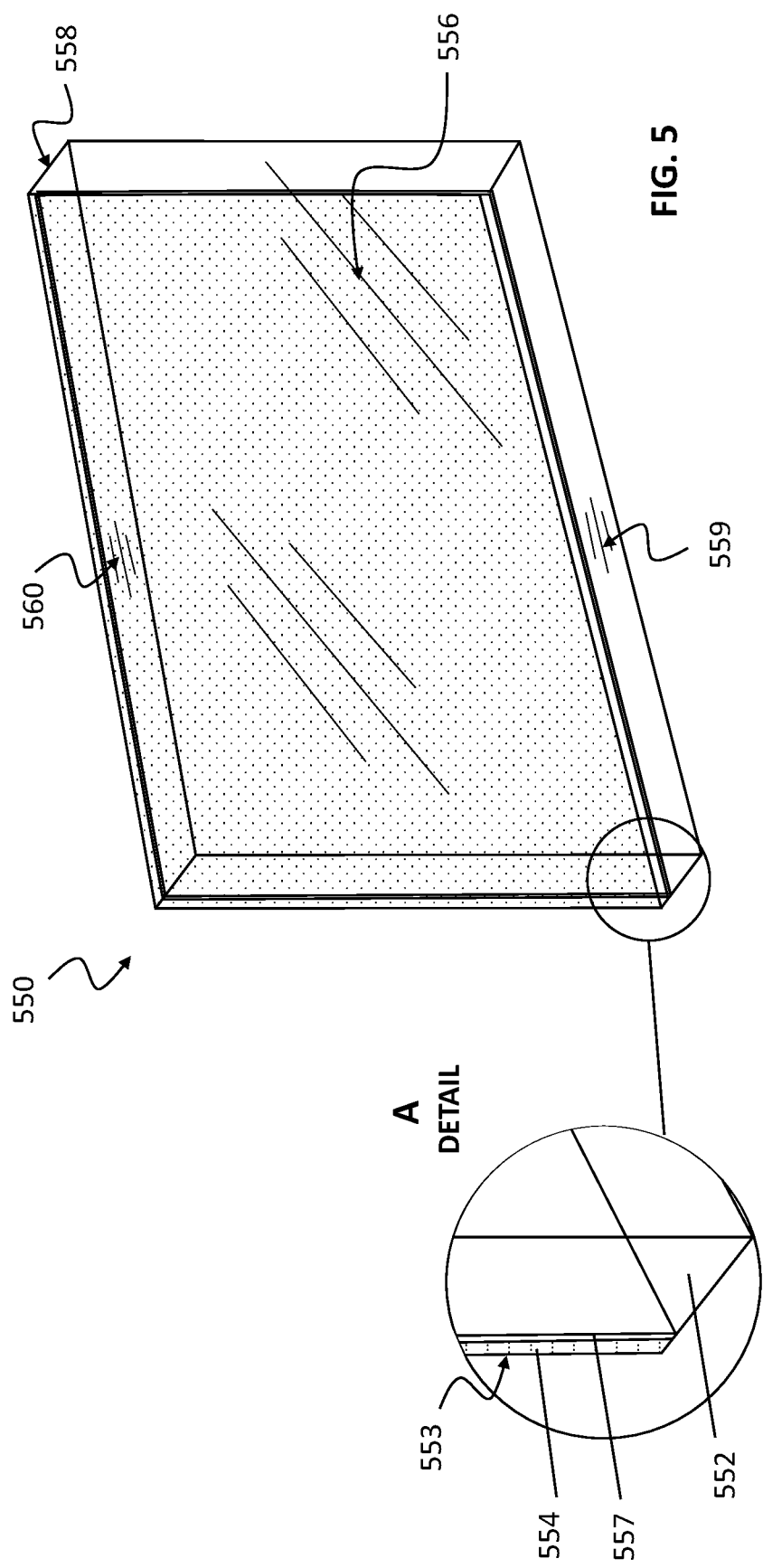
FIG. 5 shows one embodiment of a termination element with optional lens portions, opaque end coatings, rear surface reflective coating and side surface reflective coatings.

FIG. 5 shows one embodiment of an optional termination element 550 corresponding to the termination element 150 shown in FIG. 1. The termination element acts to terminate a light rail assembly with a connection element in place, operating to block any extraneous light to exit the terminal end or terminus of a light rail assembly, by means of being opaque or having an opaque outer coating, film, layer or treatment that prevents the passage of light across the termination element cross-section.

In the embodiment shown in FIG. 1, the termination element 150 is essentially a flat rectangular shaped piece of material that is opaque or non-transmissive to light, and is positioned externally adjacent to a connection element 130 so as to prevent the escape of any light from the interior of the T-bar channel 102 to the outside of the light rail assembly 100. Referring to FIG. 5 again, in most embodiments, the thickness of the termination element 550 is much smaller in cross section compared to the other dimensions, height and length, of 550. In some embodiments, the termination element 550 consists of a single layer of an opaque material with minimal thickness just sufficient to render the element opaque or non-transmissive. Examples include a single monolithic sheet of an opaque plastic, metal or polymer sheet.

In other embodiments represented in general in FIG. 5, the termination element 550 can be a compound element, that is, constructed of more than a single monolayer of a single material, but comprising multiple layers, films, coatings or combinations thereof, including coatings or films applied to one or more sides, edges or surfaces of the element 550. In these further related embodiments, the films and coatings are selected to provide additional internal reflection of light to assist the primary prismatic lens as disclosed in collecting and redirecting additional light or illumination that would otherwise pass into or through the termination element 550 and be absorbed therein.

In the embodiment shown in FIG. 5, the termination element 550 is configured into the shape of a flat rectangular shaped element featuring a terminal lens portion 552 having a termination exterior surface 553 that is opaque to transmitted light due to a opaque end coating 554 applied thereto, but which additionally features either another reflective coating applied thereon or a separate rear surface reflective coating 557 or element (film, layer) that is highly reflective to light and is reflective on its interior side facing inwards toward the open T-bar channel of the light rail assembly or termination element emplaced on the terminus of a light rail assembly according to the present disclosure.

In another related embodiment shown in FIG. 5, one, two or all three of the right and left surfaces (558, R & L) and bottom surfaces 559 of the terminal lens portion 552 are also coated with an interior reflective coating or element (film, layer) that is highly reflective to light and operates to redirect light either upward through the uncoated top surface 560 and termination interior surface 556, or both. In another closely related embodiment, the top surface 560 is also coated with an interior reflective coating or element (film, layer) that also serves to redirect light back into the terminal lens portion 552 and ultimately back through the termination interior surface 556 back in the original direction of propagation of the light first entering the interior surface 556.

In embodiments wherein the termination element 550 bears at least one reflective surface, some incident illumination or light entering 550 is at least partially redirected back through the termination interior surface 556 owing to multiple internal reflections, which are increased in intensity and efficiency by means of a reflective coating applied to an exterior surface or layered onto an exterior surface of the termination element 550.

In other embodiments, the termination element can feature additional securement tabs (as shown in FIG. 1) that enable the termination element to be secured to the outside surface of the connection yoke. In other embodiments, particularly where the termination element is a monolithic element and is intended to block transmitted light, the termination element may be secured to the outside surface of the connection yoke by simpler means, including the use of an adhesive, glue, magnetic and metallic element, complementary hook and loop elements (for example, Velcro™) and combinations thereof.

Figure 6:
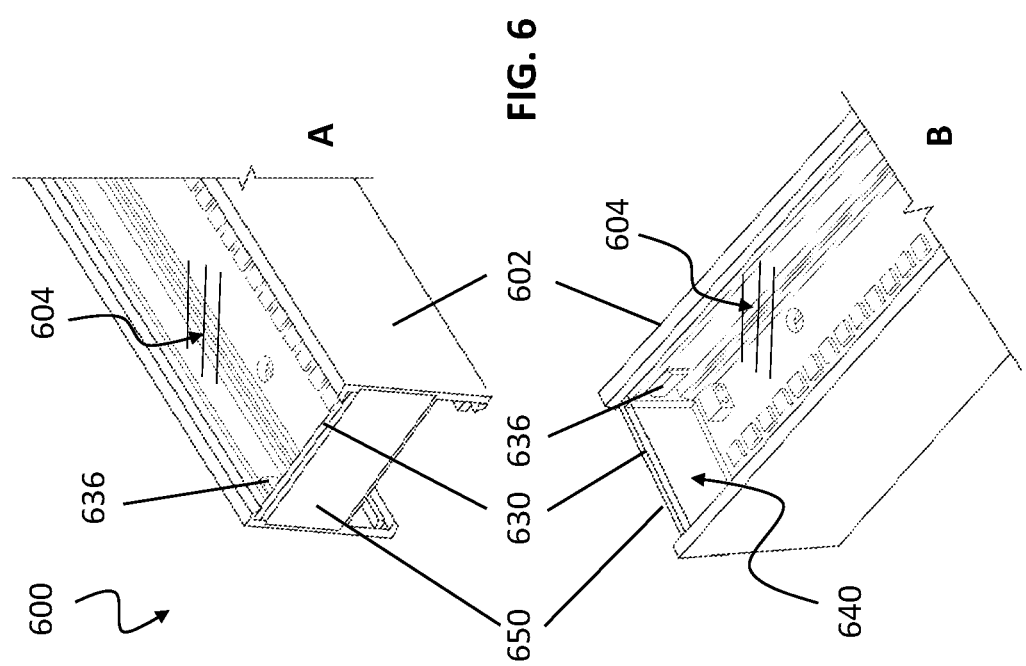
FIG. 6 shows one embodiment of a set of light rail assemblies each terminated by means of a connection element bearing a termination element in a free end configuration of a light rail assembly.

FIG. 6 shows the terminal end or terminus of two light rail assemblies 600 that have, in this embodiment representing a free end configuration of adjacent units 691, been both been terminated with a connection element 630 having a prismatic lens 640 in place and a termination element 650. FIG. 6 illustrates that the placement of the connection element 630 employs the engagement of multiple yoke securement tabs 636 to secure the connection elements 630 in place within the T-bar rail channel 602 of the light rail assembly 600. In this embodiment, two termination elements 650 are attached to the outside of each of the connection elements 630, serving to block the transmission of light from the terminal end of the respective light rail assemblies 600. FIG. 6 illustrates that when the connection element 630 is in place with its corresponding prismatic lens 640 present, that the top surface and interior edge of the prismatic lens 640 abuts with the adjacent primary lens 604, producing a seamless interface between the two, which when illumination is present, is uniformly illuminated over the transition region sufficiently so as to reduce the perception of any gap in illumination, resulting in the perception of a continuously and uniformly illuminated surface area extending across the primary lens 604, the prismatic lens 640 to the terminal end of the light rail assembly.

In this embodiment, the light rail assemblies 600 can still be positioned in and end-to-end configuration with the respective terminal ends in contact with one another, and by virtue of the connection elements 630 present, providing continuous illumination resulting in the perception of a continuously and uniformly illuminated surface area extending across the zone of the junction between the adjacent light rail assemblies.

Figure 7:
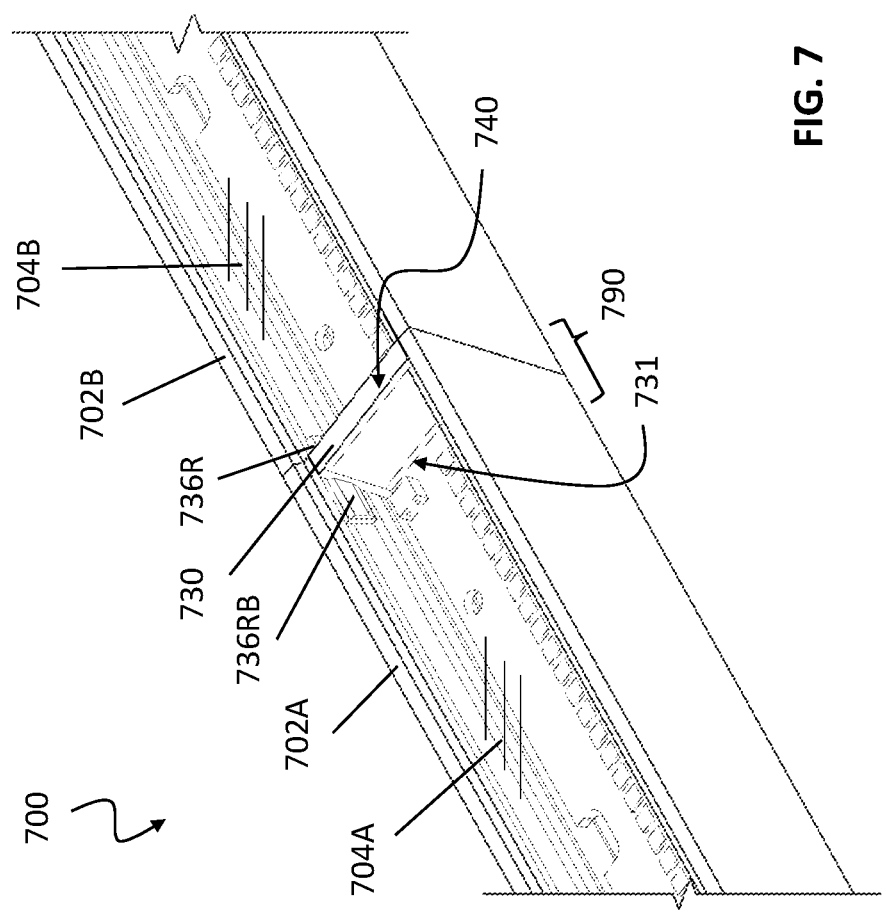
FIG. 7 shows an embodiment of a light rail assembly connected to a second light rail assembly by means of a connection element bearing a prismatic lens in an end-to-end configuration of the light rail assemblies.

FIG. 7 shows an additional embodiment of the present disclosure employing a connection element 730 configured as described hereinabove with dual sets of yoke securement tabs 736 (736R and 726B shown, two additional tabs 736L and 736LB not visible in the figure as presented) operating to reversibly secure the two light rail assemblies 700 in an end-to-end configuration 790 wherein the respective two T-bar rails, 702A and 702B, are adjoined end-to-end by means of an intervening connection element 730 having the two sets of opposed yoke securement tabs 736 present.

In this particular embodiment, the yoke portion 731 of the connection element 730 operates to secure the prismatic lens 740 in place, with the two sides of the prismatic lens 740 being in close proximity or contact with the primary lens 704A on side and contact with the primary lens 704B located on the second T-bar rail 702B. In this configuration, the prismatic lens 730 operates to extend the zone of illumination between the two primary lens 704, so that there is no gap or perceived difference in illumination across the junction of the light rail assemblies 700 in the end-to-end configuration 790 as illustrated in FIG. 7, resulting in the perception of a continuously and uniformly illuminated surface area extending across the entire junction of the two adjacent light rail assemblies.

Materials of Construction

The inventive light injected terminal lensing, connection, coupling and termination elements and devices of the present disclosure can be made of any suitable material and formed by any suitable manufacturing techniques. Suitable materials of construction include, but are not limited, to a metal, composite, alloy, polymer, resin, filled polymer composite, and the like.

In addition, the inventive prismatic lens and other optical or light transmissive elements and components are suitably constructed of a material that is at least translucent to visible light, and more preferably clear and transparent with respect to the transmission of visible light, such materials of construction including, for example, but not limited to plastic, polymer, optical resins, glass, quartz, fused silica, and combinations thereof. Further, the optical or light transmissive elements and components of the inventive disclosure can in one embodiment be monolithic in nature, for example without limitation being a solid continuous piece of a material of construction. In alternative embodiments, the optical or light transmissive elements and components of the inventive disclosure can be constructs of multiple monolithic components, suitably assembled with optical cement or fused to provide an acceptable optical transition. In yet further embodiments, the optical or light transmissive elements and components of the inventive disclosure can be constructs of fiber optics, fiber channels, optical films and optical coatings that serve to augment, enhance and control the desired transmission of light and illumination as described herein.

Suitable manufacturing techniques by which the inventive components can be made or fashioned include injection molding, cast molding, machining, 3D-printing, and the like.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A coupling device for a light rail assembly comprising:
  A. a prismatic lens for providing illumination; wherein said prismatic lens includes:
    i. a lens front surface and a lens back surface each extending to
    ii. a lens left surface, a lens right surface and a lens bottom surface; wherein all said three surfaces are in perpendicular orientation to each other and all are connected to each other by at least one common edge to said lens front surface and said lens back surface and to each of said left and right lens surfaces by at least one common corner junction, each of said lens left and side surfaces and said lens back surface extending to
    iii. a prismatic top surface region, wherein said prismatic top surface region includes:
      (a) a lens top surface extending to said back surface, to said lens left surface and to said lens right surface and extending to
      (b) a lens top side corner apex; wherein said lens top side corner apex extends to
      (c) a lens angled light injection surface; wherein said lens angled light injection surface extends to said lens front surface forming an angle Ø with respect to the plane of said lens front surface and the plane of said lens angled light injection surface; wherein said angle Ø is between 10 and 90 degrees;
  B. a connection element for positioning and retaining said prismatic lens; wherein said connection element has a yoke configuration having
    i. a right connection riser portion, and
    ii. a left connection riser portion; each of said connection riser portions being opposed to one another, and adjacent to and extending upward from a horizontal yoke lower bar; wherein said right and left connection riser portions each bear a yoke securement tab; wherein said yoke securement tabs extend horizontally from a front surface of said connection riser portion; wherein said yoke securement tabs are configured to engage with one or a plurality of corresponding receptive T-bar connection channels located on an interior surface of a light bar assembly.

2. The prismatic lens of claim 1, wherein said prismatic lens features one or more lens positioning elements located on at least one of said lens right surface and said lens left surface; wherein said lens positioning element is selected from a bead, tab, linear protrusion, raised surface feature, and combinations thereof; wherein said lens positioning element has a geometry selected from a circle, square, rectangular, semi-circle, semi-oval, triangle or other geometric shape capable of being mated with a complimentary inversely-shaped receptive lens positioning element; wherein said lens positioning element can be in one continuous form or a plurality of discontinuous forms extending in a vertical direction on at least one of said lens side surfaces of said prismatic lens; and wherein when said lens positioning element located at said lens right or lens left surface protrudes from either of said lens surface, the corresponding lens positioning element located on said right or left connection element riser portion is in the form of a complementary inversely shaped cutout region on either of said connection element riser portion surfaces.

3. The prismatic lens of claim 1, wherein said prismatic lens features one or more lens positioning elements located on at least one of said lens right surface and said lens left surface; wherein said lens positioning element is selected from a depression, cutout, channel, divot, and combinations thereof; wherein said lens positioning element has a geometry selected from a circle, square, rectangular, semi-circle, semi-oval, triangle or other geometric shape capable of being coupled with a complimentary inversely shaped lens positioning element present on said connection element; wherein said lens positioning element can be in one continuous form or a plurality of discontinuous forms extending in a vertical direction on at least one of said side surfaces of said prismatic lens; and wherein when said lens positioning element located at said lens right or lens left surface protrudes from either of said lens surface, the corresponding lens positioning element located on said right or left connection element riser portion is in the form of a complementary inversely shaped protrusion extending from either of said connection element riser portion surfaces.

4. The prismatic lens of claim 1, wherein said lens top side corner apex features a beveled edge extending from said lens top surface and extending to said lens angled light injection surface; wherein said beveled edge has a thickness greater than or equal to a primary lens; and wherein said beveled edge forms a 90 degree angle with respect to the plane of said lens top surface.

5. The prismatic lens of claim 1, wherein said lens angled light injection surface extends to said lens front surface forming an angle Ø with respect to the plane of said lens front surface and the plane of said lens angled light injection surface; wherein said angle Ø is between 10 and 90 degrees.

6. The prismatic lens of claim 5, wherein said angle Ø is between 20 and 80 degrees.

7. The prismatic lens of claim 5, wherein said angle Ø is between 30 and 70 degrees.

8. The prismatic lens of claim 5, wherein said angle Ø is between 40 and 60 degrees.

9. The prismatic lens of claim 1, wherein said prismatic lens is constructed of an optically transparent material capable of transmitting visible light wavelengths.

10. The connection element of claim 1, wherein each of said right and left connection riser portions bears a connection yoke alignment groove in the form of a U-shaped cutout facing outward from each of the side faces of each of said connection risers and located adjacent to and below said yoke securement tabs; wherein said U-shaped cutout extends to the front side and back side of each of said connection riser portions.

11. The connection element of claim 1, wherein said right and left connection riser portions each bear a plurality of yoke securement tabs; wherein said yoke securement tabs extend in opposite directions horizontally from both said front surface and said back surfaces of both of said connection riser portions; wherein said yoke securement tabs are configured to engage with at least one or a plurality of corresponding receptive channels located on an interior surface of two light bar assemblies positioned in an end-to-end configuration wherein said plurality of yoke securement tabs operate to removable position and hold said connection element and said two light bar assemblies in a fixed position relative to each another.

12. The yoke securement tabs of claim 1, wherein said yoke securement tabs feature a truncated trapezoidal cross-section with sides tapering from a larger tab outer face to a small tab inner face extending from a tab upper slope portion and extending to a tab lower slope portion; wherein the angle β, being the angle formed between the surfaces of said tab upper slope portion and said tab lower slope portion with respect to the surface plane of the tab outer face, is between 20 degrees and 60 degrees.

13. The yoke securement tabs of claim 12, wherein said angle, β, is between 30 degrees and 45 degrees.

14. The coupling device of claim 1 further comprising a termination element; wherein said termination element operates to terminate a light rail assembly; wherein said termination element is opaque to visible light through its minor cross-section (thickness); and wherein said termination element is removably positionable adjacent to and in parallel orientation with respect to said lens back surface of said prismatic lens.

15. The coupling device of claim 14 wherein said termination element features one or two securement tabs located on either a left or right side of said termination element; wherein said securement tabs extend horizontally from a interior surface of said termination element and wherein said securement tabs are positioned and sized in order to mate with said connection yoke alignment tabs located on the outside surfaces of said respective left and right connection riser portions of said connection element.

16. The coupling device of claim 14 wherein said termination element is configured in the form of a layered compound construct of at least two layers of distinct materials; wherein said layered compound construct is in the form of a rectangular solid having a top side, left side, right side, front side, back side and bottom side; wherein said back side bears a layer of material that is opaque to visible light; and wherein said a least one layer adjacent to said front side is transparent to visible light; and wherein at least one of said left side, right side and bottom sides may optionally bear a coating of a third material; wherein said third material is reflective with respect to incident visible light; and wherein at least one of said coated sides operates to internally reflect and redirect any incident light entering said front side to be retransmitted at least in part through said top surface in an outgoing direction with respect to said top surface.

17. A light rail assembly comprising:
A. one or a plurality of T-bar rail channels; each of said T-bar rail channels consisting of
  i. a primary lens; wherein said primary lens is positionable within a plurality of upper receptive grooves with said T-bar rail channels configured to receive and secure said primary lens;
  ii. a light engine board; wherein said light engine board features one or a plurality of light emitting elements located on a top surface of said light engine board and configured to emit visible radiation in the direction of said primary lens;
  iii. a coupling device that operates to terminate one or both of said T-bar channels; wherein said coupling device is in the form of a U-shaped yoke with a right connection riser portion extending from a yoke lower bar and an opposed left connection riser portion extending from said yoke lower bar; wherein said right and left connection riser portions each bear at least one yoke securement tab positioned on at least one inner side of said coupling device and configured to engage with and be secured within at least one of a plurality of lower receptive grooves within said T-bar rail channels; wherein said coupling device supports a prismatic lens;

iv. a prismatic lens; wherein said prismatic lens is configured to have a prismatic top surface region, a lens angled light injection surface and a lens lower portion; wherein said prismatic lens is configured to receive and redirect incident illumination outward in a direction normal to the top surface of the prismatic top surface region; wherein said prismatic lens includes:

(a) a lens front surface and a lens back surface each extending to
(b) a lens left surface, a lens right surface and a lens bottom surface; wherein all said three surfaces are in perpendicular orientation to each other and all are connected to each other by at least one common edge to said lens front surface and said lens back surface and to each of said left and right lens surfaces by at least one common corner junction, each of said lens left and side surfaces and said lens back surface extending to
(c) a prismatic top surface region, wherein said prismatic top surface region includes:
  (i) a lens top surface extending to said back surface, to said lens left surface and to said lens right surface and extending to
  (ii) a lens top side corner apex; wherein said lens top side corner apex extends to
  (iii) a lens angled light injection surface; wherein said lens angled light injection surface extends to said lens front surface forming an angle Ø with respect to the plane of said lens front surface and the plane of said lens angled light injection surface; wherein said angle Ø is between 10 and 90 degrees;

v. a plurality of lower receptive grooves within said T-bar rail channels configured to receive and reversibly secure one or a plurality of said yoke securement tabs; and vi. one or a plurality of termination elements located on the outside facing surface of said prismatic lens; wherein said termination element operates to block the transmission of visible light outward from the distal end of said T-bar rail channel.

18. The light rail assembly of claim 17 wherein said coupling device operates to position and removably secure two adjacent T-bar rail channels together in a fixed end-to-end configuration with said coupling device sandwiched in a junction between a distal end of one of said T-bar rail channels and a proximate end of said second T-bar rail channel; wherein said coupling device features two opposed sets of one or a plurality of said yoke securement tabs; wherein said opposed sets of said yoke securement tabs extend outwardly and in a normal horizontal direction with respect to a back and front surface of said connection element; wherein said opposed sets of said yoke securement tabs are located on said back and said front surface of said right and said left connection riser portion; and wherein said prismatic lens is configured to be immediately adjacent to and in contact with both primary lenses of said two adjacent T-bar rail channels so as to form a continuous and seamless illumination zone that extends across said junction occupied by said coupling device.

19. The light rail assembly of claim 17 wherein said coupling device further operates to secure a termination element to a distal end of said T-bar rail channel; wherein said termination element comprises one or a plurality of optical layers wherein at least one of said optical layers is an opaque layer that does not transmit visible wavelengths of light; wherein said termination element optionally includes one optical layer that is capable of transmitting or reflecting visible wavelengths of light; wherein said second optical layer may be in the form of a rectangular optical block with three of the sides of said optical block being coated with an internally reflective coating.

20. The light rail assembly of claim 19, wherein said termination element further includes a plurality of at least two termination element securement tabs extending outward and normally from the surface of one interior facing side of said termination element; wherein said securement tabs are configured to reversibly engage with and be secured within corresponding connection yoke alignment grooves present on one or more of said connection riser portions of said yoke portion of said connection element.

* * * * *